(12) United States Patent
Itagaki et al.

(10) Patent No.: US 11,588,259 B2
(45) Date of Patent: Feb. 21, 2023

(54) BATTERY TERMINAL

(71) Applicant: Yazaki Corporation, Tokyo (JP)

(72) Inventors: Tatsumasa Itagaki, Makinohara (JP);
Tadahisa Sakaguchi, Makinohara (JP);
Takayuki Kato, Makinohara (JP)

(73) Assignee: YAZAKI CORPORATION, Minato-ku (JP)

( * ) Notice: Subject to any disclaimer, the term of this patent is extended or adjusted under 35 U.S.C. 154(b) by 0 days.

(21) Appl. No.: 17/352,572

(22) Filed: Jun. 21, 2021

(65) Prior Publication Data

US 2022/0021136 A1     Jan. 20, 2022

(30) Foreign Application Priority Data

Jul. 15, 2020  (JP) .............................. JP2020-121521

(51) Int. Cl.
| | | |
|---|---|---|
| *H01R 11/28* | (2006.01) | |
| *H01R 4/30* | (2006.01) | |
| *H01R 11/26* | (2006.01) | |

(52) U.S. Cl.
CPC ........... *H01R 11/283* (2013.01); *H01R 4/302* (2013.01); *H01R 11/26* (2013.01)

(58) Field of Classification Search
None
See application file for complete search history.

(56) References Cited

U.S. PATENT DOCUMENTS

2018/0006387 A1  1/2018  Falchetti
2018/0076437 A1  3/2018  Goldschmidt et al.

FOREIGN PATENT DOCUMENTS

DE    102017217509 A1   10/2018
DE    102018207887 A1   11/2018

*Primary Examiner* — Ross N Gushi
(74) *Attorney, Agent, or Firm* — Sughrue Mion, PLLC

(57) ABSTRACT

A battery terminal includes a terminal main body and a protector to be mounted to the terminal main body, wherein the terminal main body includes an operating section for clamping and tightening the battery post, and the protector includes a movable section provided with a contact section to be brought into contact with the upper surface of the battery main body, and a displacement section to be freely displaced between a covering position for covering the operating section and a retracted position with an external force applied on the contact section, wherein in the retracted position, the displacement section is retracted from the covering position, and wherein the displacement section is displaced to the retracted position by pressing the contact section against the upper surface of the battery main body so that the access to the operating section is allowed.

4 Claims, 11 Drawing Sheets

BATTERY TERMINAL

BACKGROUND OF THE INVENTION

Technical Field

The present invention relates to a battery terminal to be connected to a battery post.

Background Art

Conventionally, power supply may be or is often performed to various circuits from a battery in a vehicle via a battery terminal (see e.g. Patent Document 1).

Patent Document 1 discloses a battery terminal which is configured to be connected electrically and mechanically to battery posts, the battery posts protruding from an upper surface of a battery main body. The battery terminal includes a terminal main body with a tightening section for tightening the battery posts, a main body section 5 with a pair of plate-shaped elements 3, 3, post holes 9, 9 each provided in one of the pair of plate-shaped elements 3, 3 for inserting battery posts 7 through the post holes 9, 9, slits 11, 11 each provided in one of the pair of plate-shaped elements 3, 3 and being connected to the post holes 9, 9 from an end of the plate-shaped element 3, 3, plate elements 13 to be arranged between the pair of plate-shaped elements 3, 3 and at both ends of the pair of plate-shaped elements 3, 3 with the slits 11 being interposed between the plate elements 13, a bolt 21 to be arranged at one end side of the plate elements 13 and configured for inserting a fastening section 19, the fastening section 19 being configured so that a nut 17 is fastened in a bolt insertion hole 15 extending through the plate element 13, a bracket 23 arranged between the plate elements 13 and the nut 17 and configured to press the pair of plate-shaped elements 3, 3 from the one end side to the other end side of the plate elements 13 by means of fastening the nut 17, and a holding section 25 provided at the other end side of the plate elements 13, wherein the holding section 25 is configured to be engaged with the pair of plate-shaped elements 3, 3 and to narrow the slits 11 under receiving a pressing force applied on the pair of plate-shaped elements 3, 3 by the bracket 23. The battery terminal further includes a spring element supported by the terminal main body and configured to be positioned between the terminal main body and the upper surface of the battery main body, a clamp section for maintaining a tightened state of the battery posts established by the tightening section, and a fastening element configured to be fastened by being inserted through the terminal main body and the clamp section in the tightened state where the battery posts are tightened by the tightening section. The fastening element includes a bolt and a nut to be screwed into the bolt. The bolt includes a shaft and a head provided at an end of the shaft.

The spring element is supported at its one end by the terminal main body, wherein the head of the bolt is fixed to the other end of the spring element. By pressing the spring element against the upper surface of the battery main body and thus elastically deforming the spring element, the shaft of the bolt is kept in a substantially perpendicular posture with respect to the upper surface of the battery main body.

Such a conventional battery terminal is configured so that the spring element is elastically deformed by bringing it into contact with the upper surface of the battery main body so that the shaft of the bolt is kept in the substantially perpendicular posture with respect to the upper surface of the battery main body (kept in a correct mounted position). By screwing the nut with the shaft of the bolt being in the correct mounted position, the terminal main body, the spring element and the clamp section to be fixed. In this manner, the battery terminal is connected to the battery posts.

CITATION LIST

Patent Literature

Patent Document 1: US 2018/006387 A1

SUMMARY OF THE INVENTION

However, in the conventional battery terminal, the shaft of the bolt is in a tilted posture with respect to the upper surface of the battery main body (in an incorrect mounted position) in a non-contact state of the spring element with the upper surface of the battery main body, so that this posture may be maintained at the time of tightening the nut. This means that the conventional battery terminal may not be mounted to the battery posts appropriately.

An objective of the present invention is to provide a battery terminal which enables mounting it to a battery post appropriately.

In order to achieve the above-mentioned objective, a battery terminal according to one aspect of the present invention is configured to be connected to a battery post which protrudes from an upper surface of a battery main body, and includes a terminal main body and a protector, the protector being configured to be mounted to the terminal main body and positioned between the terminal main body and the upper surface of the battery main body, wherein the terminal main body includes a pair of clamping sections and an operating section, the pair of clamping sections being configured to clamp the battery post and the operating section being configured to cause the pair of clamping sections to approach each other and tighten the battery post, wherein the protector includes a protector supporting section supported by the terminal main body, and a movable section connected to the protector supporting section, wherein the movable section is provided with a contact section and a displacement section, the contact section being configured to be brought into contact with the upper surface of the battery main body, and the displacement section being configured to be displaced with an external force applied on the contact section, wherein the displacement section is provided so as to be freely displaced between a covering position and a retracted position, wherein the displacement section is configured to cover the operating section in the covering position, and in the retracted position, to be retracted to an outside of the operating section from the covering position, wherein when the displacement section is in the covering position, an access to the operating section is limited, and wherein the displacement section is configured to be displaced from the covering position to the retracted position by pressing the contact section against the upper surface of the battery main body so that the access to the operating section is allowed.

According to an embodiment of the present invention, the movable section may be formed by bending a plate-shaped element in an appropriate position, wherein the movable section may include a first continuous section which is continuous with the protector supporting section and the contact section, wherein in a contact state with the upper surface of the battery main body, the contact section may be positioned on an end side of the protector supporting section, the end side being located farther from the first continuous section of the protector supporting section than a boundary position between the protector supporting section and the first continuous section.

According to another embodiment of the present invention, the movable section may include a second continuous section which is continuous from the contact section to the displacement section, wherein when the displacement section is in the covering position, the second continuous section may be configured to be in contact with the upper surface of the battery main body.

According to another embodiment of the present invention, the movable section may include a bar-shaped section configured to be supported by the protector supporting section in a rotatable manner, wherein the bar-shaped section may be provided with the contact section at one end and connected to the displacement section at another end, wherein as the contact section is pressed against the upper surface of the battery main body, the bar-shaped section may be rotated relative to the protector supporting section so that the displacement section is displaced together with the bar-shaped section from the covering section toward the retracted section.

According to another embodiment of the present invention, the bar-shaped section may be supported so as to be rotatable relative to the protector supporting section around an axis of the bar-shaped section.

According to the above-described aspect of the present invention, the protector includes a protector supporting section supported by the terminal main body, and a movable section connected to the protector supporting section, wherein the movable section is provided with a contact section and a displacement section, the contact section being configured to be brought into contact with the upper surface of the battery main body, and the displacement section being configured to be displaced with an external force applied on the contact section, wherein the displacement section is provided so as to be freely displaced between a covering position and a retracted position, wherein the displacement section is configured to cover the operating section in the covering position, and in the retracted position, to be retracted to an outside of the operating section from the covering position, wherein when the displacement section is in the covering position, an access to the operating section is limited, and wherein the displacement section is configured to be displaced from the covering position to the retracted position by pressing the contact section against the upper surface of the battery main body so that the access to the operating section is allowed. This means that in a state of the protector which is mounted to the terminal main body, and when the displacement section is in the covering position, the access to the operating section is limited in case of an incorrect positional relation in which the terminal main body and the upper surface of the battery main body are separated at an inappropriate distance, wherein when the displacement section is in the retracted position, the access to the operating section is allowed in case of a correct positional relation in which the terminal main body and the upper surface of the battery main body are separated at an appropriate distance. In this manner, in the case of the incorrect positional relation in which the terminal main body and the upper surface of the battery main body are separated at an inappropriate distance, the operating section may not be operated with this incorrect positional position being kept, so that it is possible to mount the battery terminal to the battery post appropriately.

DETAILED DESCRIPTION OF THE PREFERRED EMBODIMENTS

First Embodiment

Figure 1:
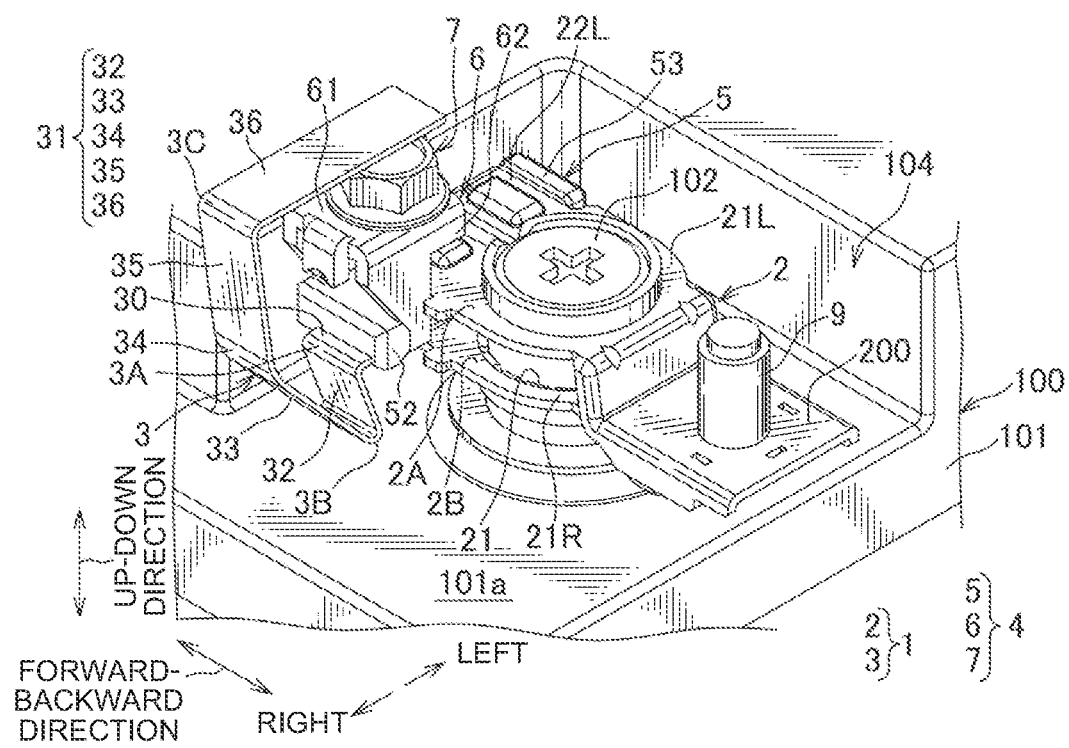
FIG. 1 is a perspective view of a battery terminal according to a first embodiment of the present invention, wherein a protector as a part of the battery terminal is in a covering position.
Figure 2:
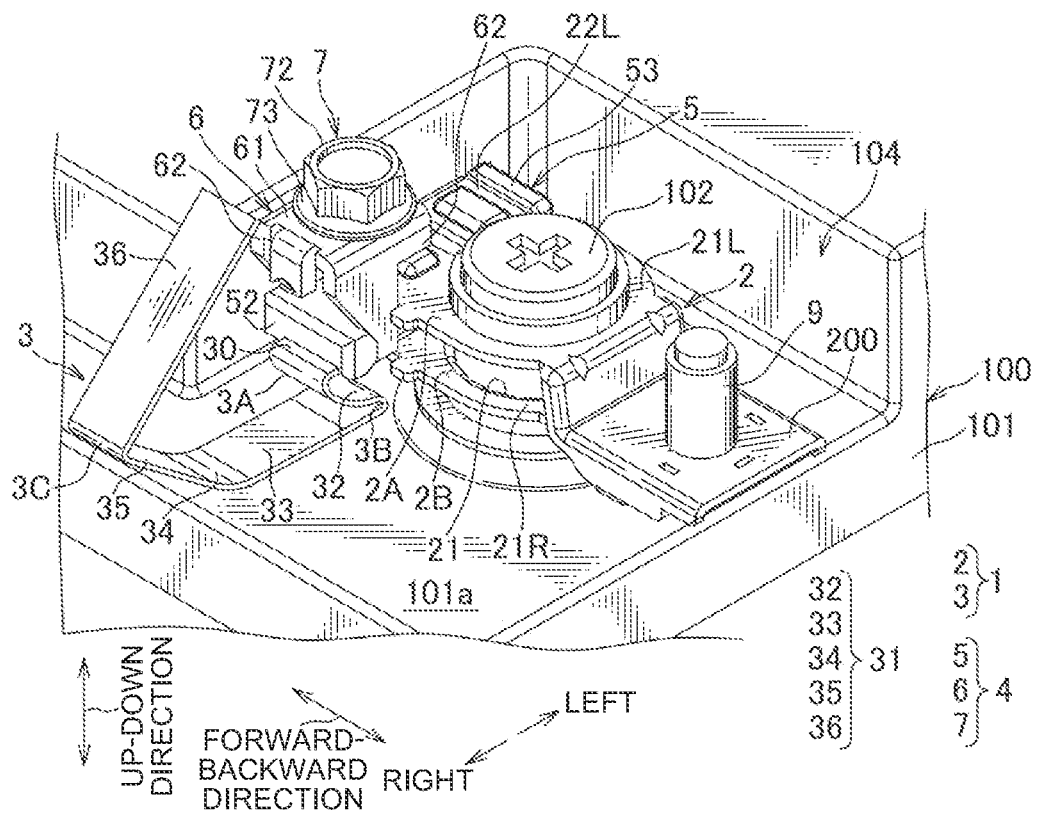
FIG. 2 is perspective view of the battery terminal, wherein the protector is in an exposed position.

Hereinafter, a first embodiment of the present invention will be described with reference to FIGS. 1 to 7. FIG. 1 shows a perspective view of a battery terminal according to a first embodiment of the present invention, wherein a protector as a part of the battery terminal is in a covering position. FIG. 2 shows a perspective view of the battery terminal, wherein the protector is in an exposed position.

As shown in FIGS. 1 and 2, a battery terminal 1 according to the first embodiment of the present invention is intended to be electrically and mechanically connected to a battery post 102 and to supply various circuits with power from a battery 100, wherein the battery post 102 protrudes from an upper surface 101a of a battery main body 101. The battery 100 includes the battery main body 101 and the battery post 102 which protrudes from the upper surface 101a of a recess 104, wherein the recess 104 is positioned at a corner of the battery main body 101.

According to the present embodiment, a direction in which the battery post 102 protrudes from the upper surface 101a of the battery main body 101 may be referred to as an "up-down direction", wherein one direction of extension of the upper surface 101a of the battery main body 101 which is orthogonal to the up-down direction may be referred to as a "right-left direction", wherein in the one direction, a pair of approach/separation elements 22R and 22L as described below are opposed to each other which form part of a terminal main body 2, wherein another direction of extension of the upper surface 101a of the battery main body 101 which is orthogonal to the right-left direction may be referred to as a "forward-backward direction".

Figure 3:
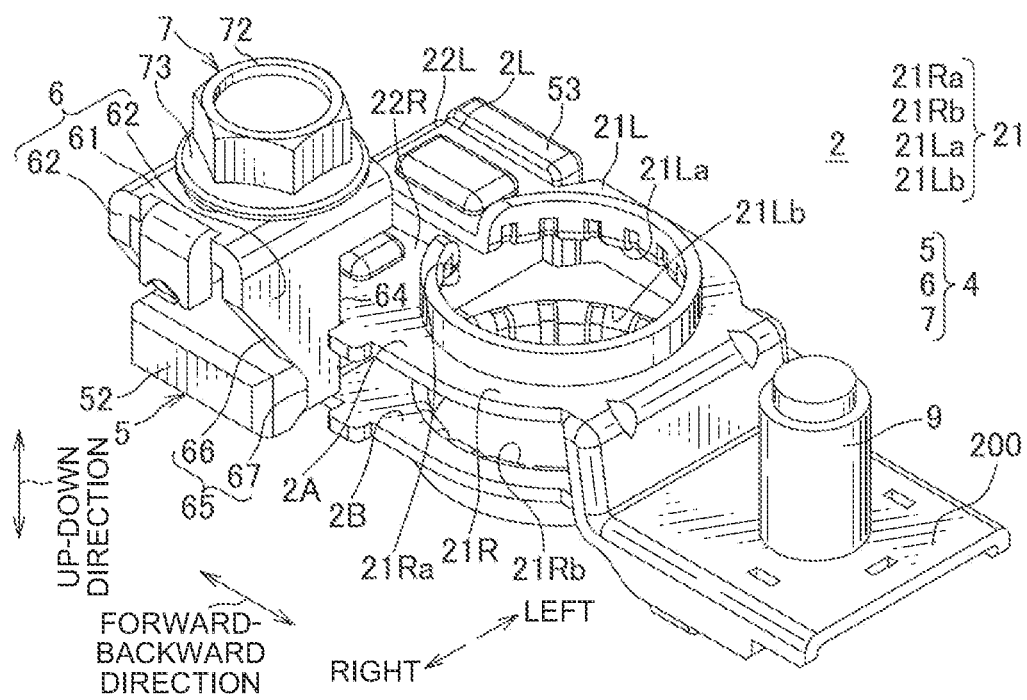
FIG. 3 is a perspective view of a terminal main body as a part of the battery terminal.
Figure 4:
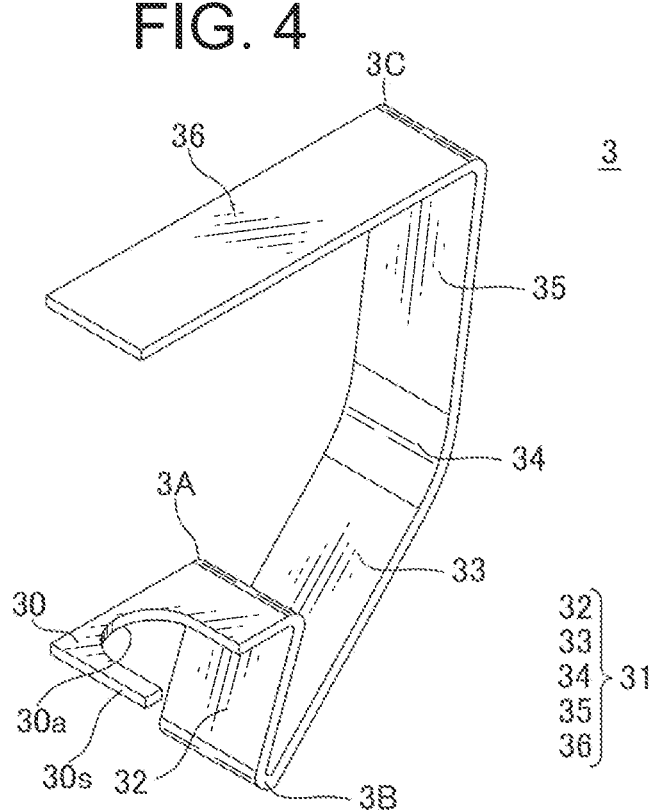
FIG. 4 is a perspective view of the protector.
Figure 5:
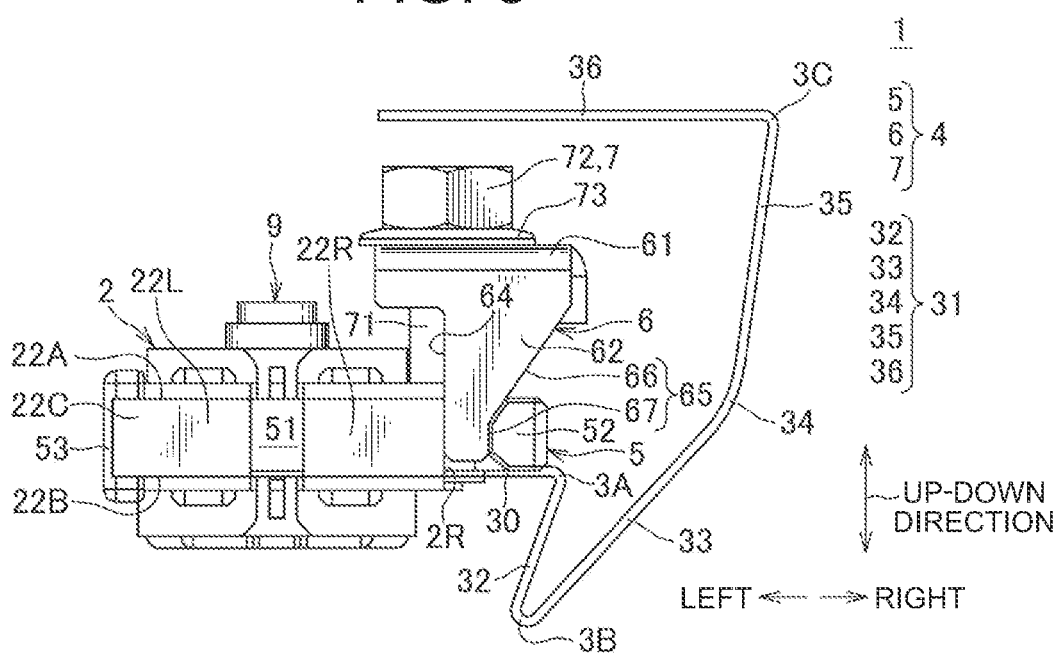
FIG. 5 is a side view for illustrating a procedure how the protector may be mounted to the terminal main body.

As shown in FIGS. 3 to 5, the battery terminal 1 includes a terminal main body 2 (shown in FIGS. 3 and 5) and a protector 3 (shown in FIGS. 4 and 5), the protector 3 being configured to be mounted to the terminal main body 2 and positioned between the terminal main body 2 and the upper surface 101a of the battery main body 101.

The terminal main body 2 includes a post connecting section 20 and a device connecting section 200 as shown in FIG. 3, wherein the post connecting section 20 is configured to be connected to the battery post 102, and the device connecting section 200 is configured to be connected to various loads (not shown), the various loads being installed in a vehicle (not shown). According to the present embodiment, the device connecting section 200 is continuous with one side of the post connecting section 20 in the forward-backward direction (at lower right in FIG. 3). The post connecting section 20 and the device connecting section 200 are formed by applying a press and/or bending process to a single metal sheet made of a conductive material.

As shown in FIG. 3, the post connecting section 20 includes a pair of clamping sections 21R, 21L, a pair of approach/separation elements 22R and 22L and an operating mechanism 4, wherein the pair of clamping sections 21R, 21L is configured to insert the battery post 102 therein as well as to clamp and tighten the battery post 102, each of the pair of approach/separation elements 22R and 22L is continuous with one of both ends of the pair of clamping sections 21R, 21L, and the operating mechanism 4 is configured to cause the pair of approach/separation elements 22R and 22L to approach each other to tighten the battery post 102.

As shown in FIG. 3, each of the pair of clamping sections 21R, 21L includes an upper wall 21A and a lower wall 21B opposed to each other in the up-down direction, wherein the pair of clamping sections 21R, 21L is configured by cutting out C-shaped arc portions 21Ra, 21La, 21Rb, 21Lb (shown in FIG. 3; hereinafter, they may be collectively referred to as an "inserting portion 21") in each of the upper wall 21A and the lower wall 21B, the C-shaped arc portions 21Ra, 21La, 21Rb, 21Lb being intended for clamping the battery post 102. Namely, the upper wall 21A is provided with arc portions 21Ra and 21La, while the lower wall 21B is provided with arc portions 21Rb and 21Lb. The upper wall 21A is positioned above the lower wall 21B.

As shown in FIG. 5, each of the approach/separation elements 22R (22L) includes an upper continuous wall 22A, a lower continuous wall 22B and a coupling wall 22C, wherein the upper continuous wall 22A is continuous with the upper wall 21A of a corresponding clamping section 21R (21L), the lower continuous wall 22B is continuous with the lower wall 21B, and wherein the coupling wall 22C couples the upper continuous wall 22A to the lower continuous wall 22B, wherein each of the approach/separation elements 22R (22L) is formed in a C-shape. The pair of approach/separation elements 22R and 22L as described above is configured to be caused to approach and separated from each other in the right-left direction. By causing the approach/separation elements 22R and 22L to approach each other, they clamp the battery post 102 via the clamping sections 21R, 21L which each are continuous with the respective approach/separation elements 22R and 22L. By separating the approach/separation elements 22R and 22L from each other, the tightened battery post 102 is loosened via the clamping sections 21R, 21L which each are continuous with the respective approach/separation elements 22R and 22L.

As shown in FIGS. 3 and 5, the operating mechanism 4 includes a nut element 5, a bracket 6 and a bolt 7 (operating section), wherein the nut element 5 is configured to cause the pair of approach/separation elements 22R and 22L to approach each other and separate them from each other.

The nut element 5 is formed from a metal sheet made of a conductive material. As shown in FIGS. 3 and 5, the nut element 5 includes a plate nut main body 51 having a rectangular parallelepiped shape (shown in FIG. 5), a first contact section 52 and a second contact section 53, wherein the first contact section 52 is formed at one end of the plate nut main body 51 in a longitudinal direction (right-left direction) and configured to clamp the bracket 6 between the first contact section 52 and an end edge 2R of the approach/separation element 22R (shown in FIG. 5) and to come into contact with it, and wherein the second contact section 53 is formed at the other end of the plate nut main body 51 and configured to come into contact with an end edge 2L of the approach/separation element 22R (shown in FIG. 3). The bracket 6 will be described later. In the plate nut main body 51, a bolt hole which is not shown is provided in a position adjacent to the second contact section 52, the bolt hole being configured to be screwed to a bolt shaft 71 of the bolt 7 as described below. The plate nut main body 51 has a length which allows one of the pair of approach/separation elements 22R and 22L to be bridged to the other of the approach/separation elements 22R and 22L, while the plate nut main body 51 has a thickness which allows it to be inserted between the upper continuous wall 22A and the lower continuous wall 22B.

Figure 9:
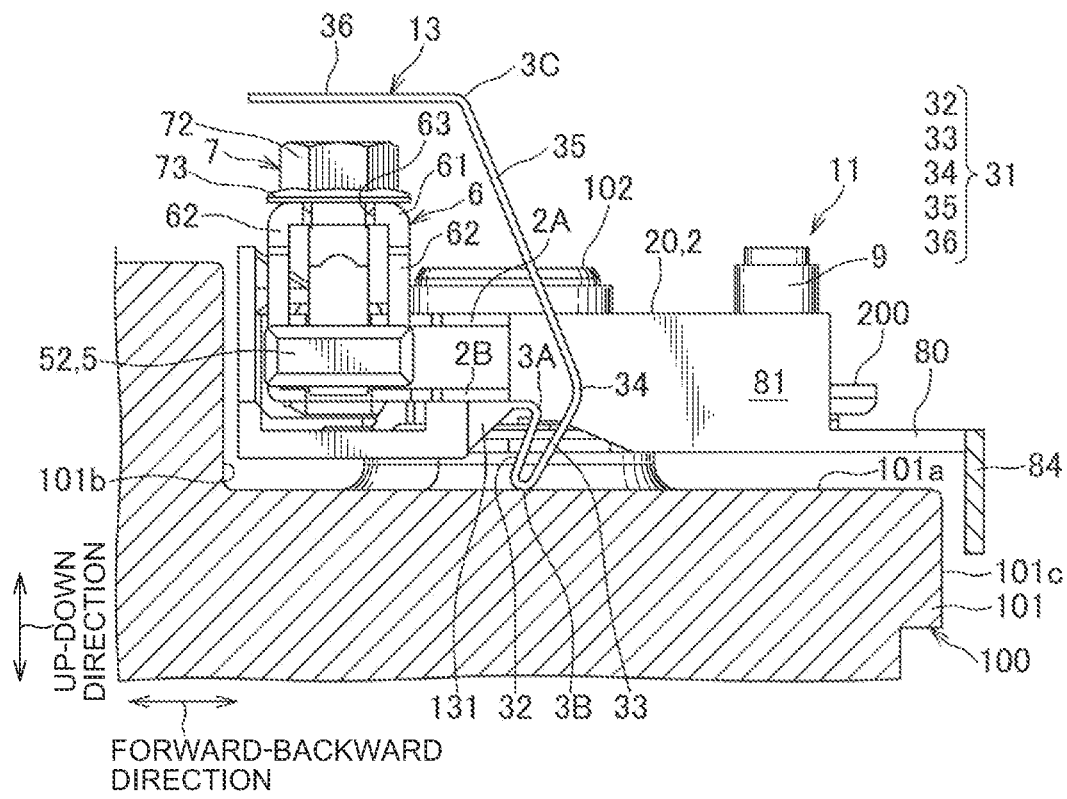
FIG. 9 is a sectional view of the battery terminal according to FIG. 8, wherein the protector is in the covering position.
Figure 10:
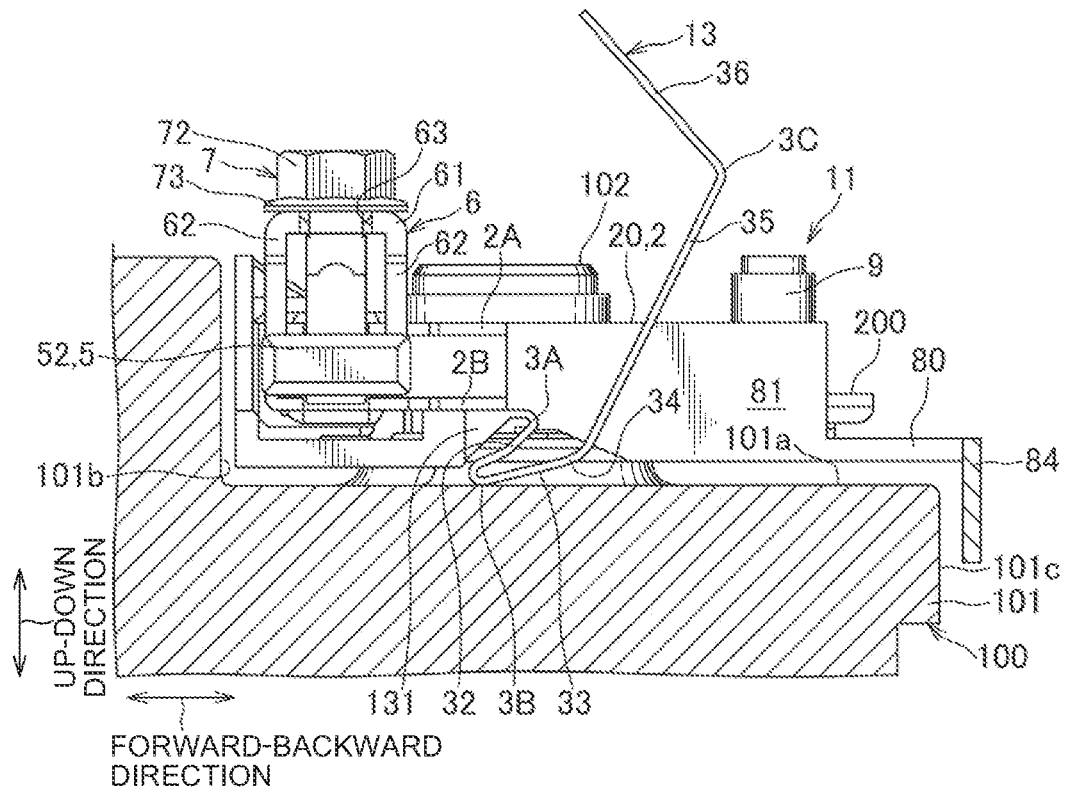
FIG. 10 is a sectional view of the battery terminal according to FIG. 8, wherein the protector is in the exposed position.

As shown in FIGS. 3 and 5, the bracket 6 includes a plate-shaped opposed plate section 61 and a pair of standing plates 62, 62, the opposed plate section 61 being configured to be arranged above and opposed to the post connecting section 20, wherein each of the pair of standing plates 62, 62 is continuous with one of both end edges of the opposed plate section 61 in its width direction (forward-backward direction) and angled at the corresponding end edge of the opposed plate section 61 to extend toward the post connecting section 20. As shown in FIGS. 9 and 10, the opposed plate section 61 has a bolt insertion hole 63 for inserting the bolt shaft 71 of the bolt 7 as described below.

Each of the standing plates 62 is formed so as to have a substantially trapezoidal shape in a plan view, as shown in FIG. 5. Each of the standing plates 62 includes a first rectilinear section 64 on one side in the right-left direction, and a second opposed section 65, wherein the second opposed section 65 is facing the other side of the standing plate 62 opposite to the first rectilinear section 64. The second opposed section 65 includes an oblique side portion 66 on an upper side and a rectilinear portion 67, the rectilinear portion 67 being located below and continuous with the oblique side portion 66. The oblique side portion 66 is formed by an oblique side so that a distance between the oblique side and the first rectilinear section 64 in the forward-backward direction is increased upwards.

As shown in FIGS. 3 and 5, the bolt 7 includes the bolt shaft 71 (shown in FIG. 5), a head 72 at a tip end of the bolt shaft 71, and a washer 73. The bolt shaft 71 has threads on its outer circumferential surface to screw it into the bolt hole of the nut element 5. It is to be noted that the washer 73 may be omitted for the bolt 7.

For tightening the battery post 102 via the pair of clamping sections 21R, 21L by operating such an operating mechanism 4, the bolt 7 is brought close to the bolt hole while clamping each of the standing plates 62 of the bracket 6 between the end edge 2R of the approach/separation element 22R and the first contact section 52 of the nut element 5, wherein the bolt 7 is then rotated in a tightening direction (e.g. clockwise). By further rotating the bolt 7, the opposed plate section 61 and the pair of standing plates 62, 62 are pressed by the head 72 of the bolt 7 to be moved downward. Since each of the standing plates 62 is formed with the oblique side portion 66 so that its width is increased upward, one (right) approach/separation element 22R is brought close to the other (left) approach/separation element 22L by the standing plates 62 and the first contact section 52, wherein these contact elements 22R, 22L which approach each other cause the clamping sections 21R, 21L to clamp and tighten the battery post 102, the clamping sections 21R, 21L being continuous with the respective contact elements 22R, 22L. On the other hand, when rotating the bolt 7 in a direction opposite to the tightening direction (e.g. counterclockwise), the one (right) approach/separation element 22R is separated from the other (left) approach/separation element 22L so that the tightened battery post 102 is loosened by the clamping sections 21R, 21L which are continuous with the respective contact elements 22R, 22L.

For the device connecting section 200, the upper wall 21A is partially bent toward the lower wall 21B to clamp a stud bolt 9 between the upper wall 21A and the lower wall 21B and thus hold the stud bolt 9 therebetween, whereby the device connecting section 200 is thus configured, as shown in FIG. 3. This stud bolt 9 is configured to be connected to various loads e.g. via fuse unit in order to supply the various loads with power of the battery 100 via the device connecting section 200 (battery terminal 1).

As shown in FIGS. 4 and 5, the protector 3 includes a protector main body 30 and a movable section 31 which is continuous with the protector main body 30, wherein the protector main body 30 is configured to be supported by the terminal main body 2. Although the protector 3 according to the present embodiment is formed from a resin moulded component, the present invention is not limited thereto. The protector may be formed by applying a press and/or bending process to a metal sheet.

In the protector main body 30, a semicircle cutout 30a is formed which can be fit on an outer surface of the bolt shaft 71 of the bolt 7, as shown in FIG. 4. Although the protector main body 30 according to the present embodiment has the cutout 30a which can be fit on the outer surface of the bolt shaft 71 of the bolt 7, the present invention is not limited thereto. Instead of the cutout 30a, the protector main body 30 may have a hole portion (not shown) formed therein which is inserted through the bolt shaft 71 of the bolt 7.

The movable section 31 includes a first continuous section 32 which is continuous with the protector main body 30, a second continuous section 33 which is continuous with the first continuous section 32, a third continuous section 34 which is continuous with the second continuous section 33, a fourth continuous section 35 which is continuous with the third continuous section 34, and a fifth continuous section 36 which is continuous with the fourth continuous section 35 (hereinafter referred to as a "displacement section 36"), as shown in FIG. 4. The first continuous section 32 is angled at a boundary position 3A to the protector main body 30 (hereinafter referred to as a "first boundary position 3A"), and subsequently extends toward the upper surface 101a of the battery main body 101. The first boundary position 3A is bent at more than or equal to 90 degrees in a natural state so that a boundary position 3B (hereinafter referred to as a "contact section 3B") between the second continuous section 33 and the third continuous section 34 is positioned on a side of a tip end 30s (left in FIG. 5) which is located farther from the first continuous section 32 of the protector main body 30 than the first boundary position 3A, as shown in FIG. 4. Furthermore, the second continuous section 33, the third continuous section 34 and the fourth continuous section 35 are bent so as to form a soft arc shape (V-shape) in the natural state. The fourth continuous section 35 and the displacement section 36 are angled at a boundary position 3C so that the displacement section 36 and the protector main body 30 are opposed to each other in the natural state.

For mounting such a protector 3 to the terminal main body 2, the tip end 30s of the protector main body 30 is inserted between the plate nut main body 51 of the nut element 5 and the lower continuous wall 22B of the approach/separation element 22R, and the bolt 7 is rotated in the tightening direction while the cutout 30a in the protector main body 30 is fit on the outer surface of the bolt shaft 71, as shown in FIG. 5, whereby a tip end portion of the protector main body 30 is inserted between the lower continuous wall 22B of the approach/separation element 22R and the nut element 5. In this manner, the protector 3 is mounted to the terminal main body 2.

Figure 6:
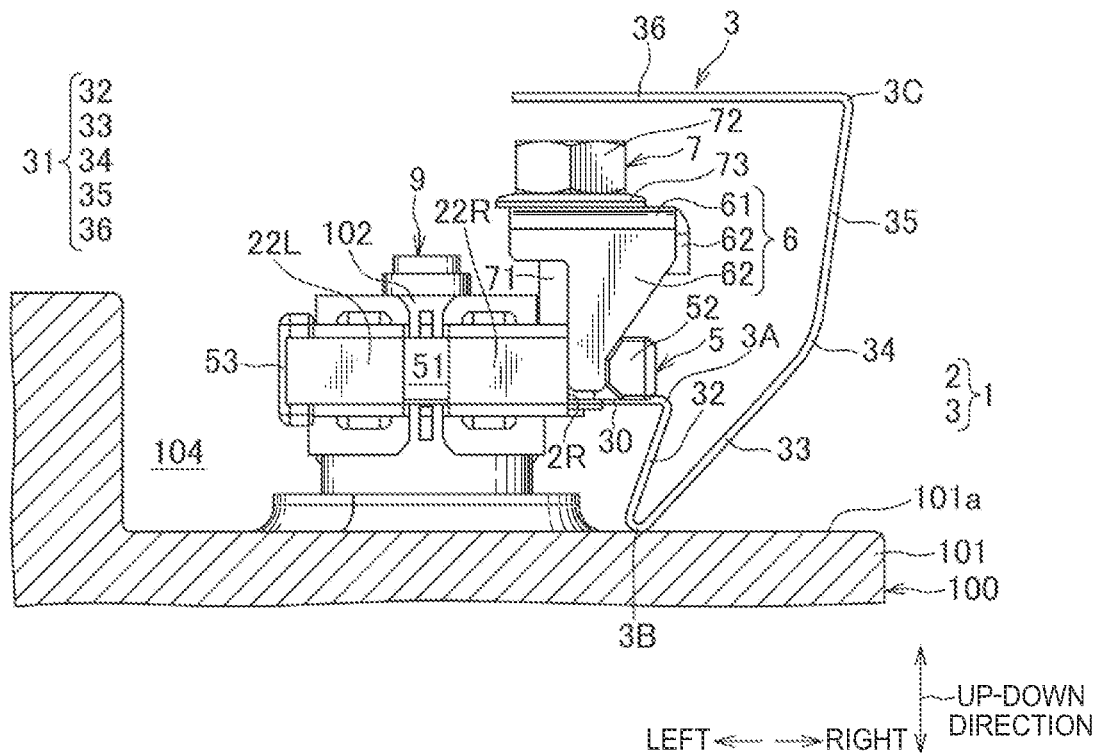
FIG. 6 shows a procedure of connecting the battery terminal to the battery post in a sectional view, wherein the protector is in a covering position.
Figure 7:
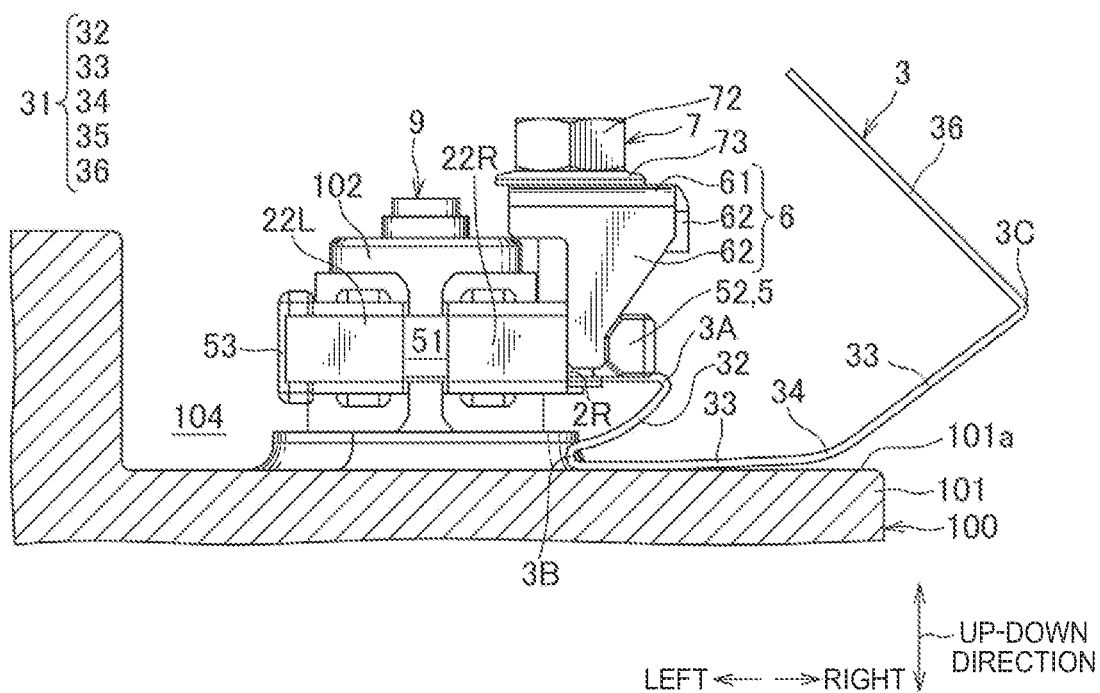
FIG. 7 shows a post-process after FIG. 6 in a sectional view, wherein the protector is in the exposed position.

In a state of the protector 3 which is mounted to the terminal main body 2, the displacement section 36 is in a first position (covering position shown in FIG. 6) in the natural state, as shown in FIGS. 6 and 7, wherein the contact section 3B is slid to left in FIG. 5 (to the side of the tip end 30s of the protector main body 30) by pressing the contact section 3B against the upper surface 101a of the battery main body 101 while the contact section 3B is in contact with the upper surface 101a so that the second continuous section 33 comes into contact with the upper surface 101a, and wherein the displacement section 36 is displaced to a second position by further pressing the second continuous section 33 against the upper surface 101a. When the displacement section 36 is in the first position, the displacement section 36 is positioned above the bolt 7 and access to the bolt 7 is limited, while in the second position of the displacement section 36 (retracted position shown in FIG. 7), the displacement section 36 is retracted from above the bolt 7 to allow the access to the bolt 7.

In the following description, a procedure of connecting the battery terminal 1 to the battery post 102 will be described with reference to FIGS. 6 and 7.

First, while the protector 3 is mounted to the terminal main body 2, the inserting portion 21 between the pair of clamping sections 21L and 21R is brought close to the battery post 102 in order to insert the battery post 102 therebetween. At this time, the displacement section 36 of the protector 3 is in the first position.

In a state of the protector 3 which is in the first position, the displacement section 36 is positioned above and opposed to the bolt shaft 71 of the bolt 7 (the displacement section 36 is in such a position that it covers the bolt shaft 71), whereby the access to the bolt 7 is limited. By further inserting the battery post 102, the contact section 3B of the protector 3 comes into contact with the upper surface 101a of the battery main body 101, as shown in FIG. 6. With the contact section 3B remaining in contact with the upper surface 101a of the battery main body 101, the battery post 102 has been further inserted to reach a correct positional relation in which the terminal main body 2 and the upper surface 101a of the battery main body 101 are separated at an appropriate distance. Under this condition, pressing the contact section 3B against the upper surface 101a causes the contact section 3B to slide to left (to the side of the tip end 30s of the protector main body 30), wherein the second continuous section 33 then comes into contact with the upper surface 101a to press the second continuous section 33 against the upper surface 101a. In this manner, the protector 3 is displaced from the first position to the second position, as shown in FIG. 7.

In a state of the protector 3 which is in the second position, the terminal main body 2 and the upper surface 101a of the battery main body 101 should be in the correct positional relation in which they are separated at the appropriate distance, whereby the access to the bolt 7 is allowed. In the second position of the protector 3, the bolt 7 is rotated in the tightening direction. By further rotating the bolt 7 and thus causing the one (right) approach/separation element 22R to approach the other (left) approach/separation element 22L, the clamping sections 21R, 21L which are continuous with the respective contact elements 22R, 22L clamp and tighten the battery post 102. The bolt 7 is further rotated, and the battery post 102 is completely tightened by the pair of clamping sections 21R and 21L. In this manner, the battery terminal 1 is electrically and mechanically connected to the battery post 102.

For disconnecting the battery terminal 1 from the battery post 102, the bolt 7 is rotated in the direction opposite to the tightening direction. By further rotating the bolt 7 in the opposite direction and thus separating the one (right) approach/separation element 22R away from the other (left) approach/separation element 22L, the battery post 102 which has been tightened by the clamping sections 21R and 21L is loosened, the clamping sections 21R and 21L being continuous with the respective contact elements 22R and 22L. This is accompanied by separation of the terminal main body 2 away from the upper surface 101a of the battery main body 101 to remove the contact state of the contact section 3B of the protector 3 with the upper surface 101a of the battery main body 101. The clamping sections 21R and 21L are further separated to elastically restore the natural state of the movable section 31, wherein the protector 3 is displaced to the first position from the second position.

According to the above-described embodiment, the protector 3 includes a protector main body 30 to be supported by the terminal main body 2, and a movable section 31 extending from the protector main body 30, wherein the movable section 31 is provided with a contact section 3B and a displacement section 36, the contact section 3B being configured to be brought into contact with the upper surface 101a of the battery main body 101, and the displacement section 36 being continuous with the contact section 3B, wherein the displacement section 36 is provided so as to be freely displaced between the first position (covering position) and the second position (retracted position), wherein the displacement section 36 is configured to cover the bolt 7 (operating section) in the first position, and in the second position, to be retracted to an outside of the operating section 7 from the first position, wherein when the displacement section 36 is in the covering position, the access to the bolt 7 is limited, and wherein the displacement section 36 is configured to be displaced from the first position to the second position by pressing the contact section 3B against the upper surface 101a of the battery main body 101 so that the access to the bolt 7 is allowed. This means that in a state of the protector 3 which is mounted to the terminal main body 2, and when the displacement section 36 is in the first position, the access to the operating section 7 is limited in case of an incorrect positional relation in which the terminal main body 2 and the upper surface 101a of the battery main body 101 are separated at an inappropriate distance, while when the displacement section 36 is in the second position, the access to the operating section 7 is allowed in case of a correct positional relation in which the terminal main body 2 and the upper surface 101a of the battery main body 101 are separated at an appropriate distance. In this manner, in the case of the incorrect positional relation in which the terminal main body 2 and the upper surface 101a of the battery main body 101 are separated at an inappropriate distance, the bolt 7 may not be operated with this incorrect positional position being kept, so that it is possible to mount the battery terminal to the battery post appropriately.

Further, the movable section 31 is formed by bending a plate-shaped element in an appropriate position, wherein the movable section 31 includes the first continuous section 32 which is continuous with the protector main body 30 and the contact section 3B, wherein in a contact state with the upper surface 101a of the battery main body 101, the contact section 3B is configured to be positioned on the side of the tip end 30s (end side) of the protector main body 30, the side of the tip end 30s being located farther from the first continuous section 32 of the protector main body 30 than the first boundary position 3A between the protector main body 30 and the first continuous section 32. This enables the contact section 3B to be slid to the side of the tip end 30s of the protector main body 30 with a small force when the contact section 3B is pressed against the upper surface 101a of the battery main body 101, since in the contact state with the upper surface 101a of the battery main body 101, the contact section 3B is configured to be positioned closer to the tip end 30s in the protector main body 30 than the first boundary position 3A between the protector main body 30 and the first continuous section 32.

Further, the movable section 31 includes a second continuous section 33 which is continuous from the contact section 3B to the displacement section 36, wherein when the displacement section 36 is in the first position (covering position), the second continuous section 33 is configured to be in contact with the upper surface 101a of the battery main body 101. This achieves a configuration in which the displacement section 36 is displaced to the second position from the first position by the terminal main body 2 approaching the upper surface 101a of the battery main body 101, while the displacement section 36 is displaced to the first position from the second position by separating the terminal main body 2 from the upper surface 101a of the battery main body 101. This enables the battery terminal to be mounted to the battery post 102 appropriately without reduction in the operability.

It is to be noted that the present invention is not limited to the above-described embodiment, but includes further embodiments etc. which can achieve the objective of the present invention, wherein the present invention also includes the following variation etc.

Figure 8:
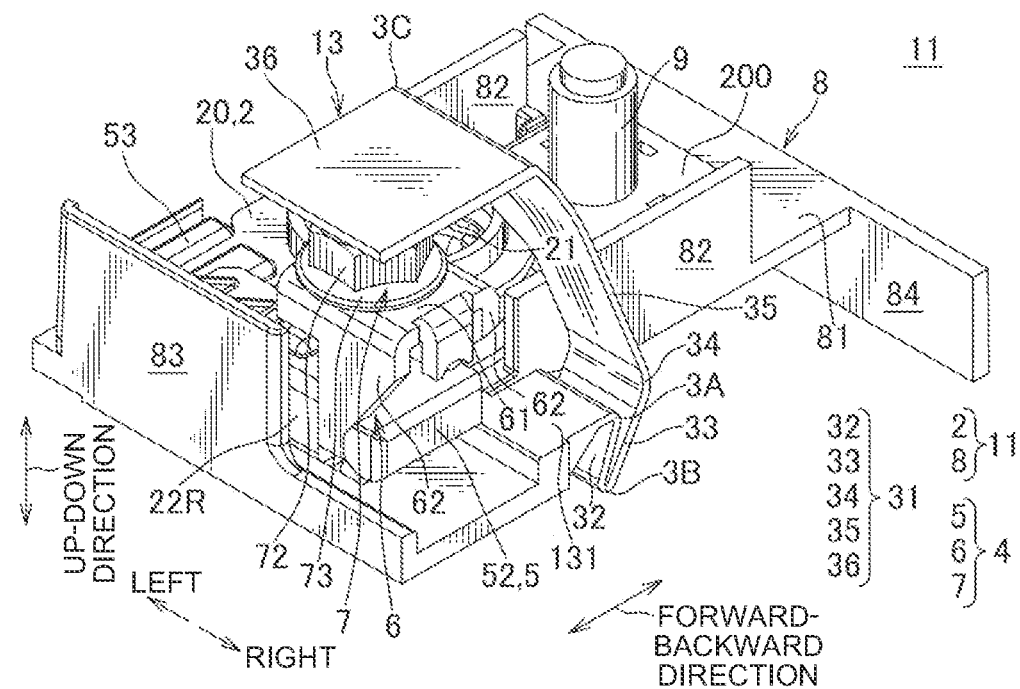
FIG. 8 is a perspective view of an exemplar variation of the battery terminal.

FIG. 8 shows a perspective view of an exemplar variation of the battery terminal. FIG. 9 shows a sectional view of the battery terminal 11 according to FIG. 8, wherein the protector 3 is in the covering position. FIG. 10 shows a sectional view of the battery terminal 11 according to FIG. 8, wherein the protector 3 is in the exposed position. It is to be noted that elements in FIGS. 8 to 10 which have the same structure and/or the same function as those in the above-described embodiment are indicated by the same reference signs, and the corresponding description will be omitted.

In addition to the battery terminal 1, the battery terminal 11 may include a rotation limiting element 8 which serves for limiting a rotation of the terminal main body 2 which accompanies the rotation of the bolt 7, as shown in FIGS. 8 to 10. This means that the battery terminal 11 may include the terminal main body 2 and the rotation limiting element 8 fixed to the terminal main body 2, wherein the rotation limiting element 8 is configured to be positioned between the terminal main body 2 and the upper surface 101a of the battery main body 101, as shown in FIGS. 8 to 10. A protector 13 may be provided integrally with the rotation limiting element 8.

As shown in FIGS. 9 and 10, the rotation limiting element 8 is fixed to the terminal main body 2 via a locking section which is not shown, wherein the rotation limiting element 8 includes a plate element 81, a pair of first standing walls 82, 82 extending upward from the plate element 81, a second standing wall 83 extending upward from the plate element 81, a third standing wall 84 extending downward from the plate element 81, and the protector 13 extending from an end edge of the plate element 81, the plate element 81 being configured to arranged between and opposed to the terminal main body 2 and the upper surface 101a of the battery main body 101. This means that the protector 13 is formed integrally with the plate element 81, the first standing walls 82, the second standing wall 83 and the third standing wall 84. Alternatively, the protector 13 may be separate from the plate element 81 and fixed to the plate element 81 via a well-known fixing means (not shown). The protector 13 includes a protector main body 130 (protector supporting section) and a movable section 31, wherein the protector main body 130 is continuous with the plate element 81, and the movable section 31 is continuous with the protector main body 130. This means that the protector 13 may be mounted to the terminal main body 2 via the plate element 81.

The pair of first standing walls 82, 82 is opposed to each other in a right-left direction, and provided so as to interpose a post connecting section 20 and a device connecting section 200 therebetween in the right-left direction. The second standing wall 83 is opposed to a second lateral surface 101b of the battery main body 101, wherein the second lateral surface 101b is continuous with one side of the upper surface 101a in a forward-backward direction. The second standing wall 83 is arranged in a position in which the second standing wall 83 is able to come into contact with the second lateral surface 101b of the battery main body 101 when the terminal main body 2 is rotated with the rotation of the bolt 7. The third standing wall 84 is opposed a third lateral surface 101c of the battery main body 101, wherein the third lateral surface 101c is continuous with the other opposite side of the upper surface 101a in the forward-backward direction. The third standing wall 84 is arranged in a position in which the third standing wall 84 is able to come into contact with the third lateral surface 101c of the battery main body 101 when the terminal main body 2 is rotated with the rotation of the bolt 7.

For connecting such a battery terminal 11 to the battery post 102, the inserting portion 21 between the pair of clamping sections 21L and 21R is caused to approach the battery post 102 in order to insert the battery post 102 into the inserting portion 21 while the rotation limiting element 8 is fixed to the terminal main body 2 via the locking section which is not shown. By further inserting the battery post 102, the contact section 3B of the protector 13 comes into contact with the upper surface 101a of the battery main body 101, as shown in FIG. 9, wherein the contact section 3B slides to bring the second continuous section 33 into contact with the upper surface 101a so that the second continuous section 33 is pressed against the upper surface 101a, This results in displacement of the displacement section 36 of the protector 13 to the second position from the first position.

In a state of the protector 13 which is in the second position, the terminal main body 2 and the upper surface 101a of the battery main body 101 should be in the correct positional relation in which they are separated at the appropriate distance, as shown in FIG. 10, whereby the access to the bolt 7 is allowed. The bolt 7 is rotated in the tightening direction. When the bolt 7 is further rotated and this rotation is accompanied by a rotation of the terminal main body 2, the second standing wall 83 and the third standing wall 84 come into contact with the respective lateral surfaces 101b and 101c of the battery main body, so that a further rotation of the terminal main body 2 is suppressed. This means that a rotation of the terminal main body 2 together with the bolt 7 is suppressed. By further rotating the bolt 7 and thus causing the one (right) approach/separation element 22R to approach the other (left) approach/separation element 22L, the clamping sections 21R, 21L which are continuous with the respective contact elements 22R, 22L clamp and tighten the battery post 102. The bolt 7 is further rotated, and the battery post 102 is completely tightened by the pair of clamping sections 21R and 21L. In this manner, the battery terminal 11 is electrically and mechanically connected to the battery post 102. According to the present embodiment, since the contact of the second standing wall 83 and the third standing wall 84 with the respective lateral surfaces 101b and 101c of the battery main body results in suppression of the rotation of the terminal main body 2 which accompanies the rotation of the bolt 7, so that it is possible to mount the battery terminal 11 to the battery post 102 appropriately while improving the operability and efficiency.

Second Embodiment

Figure 11:
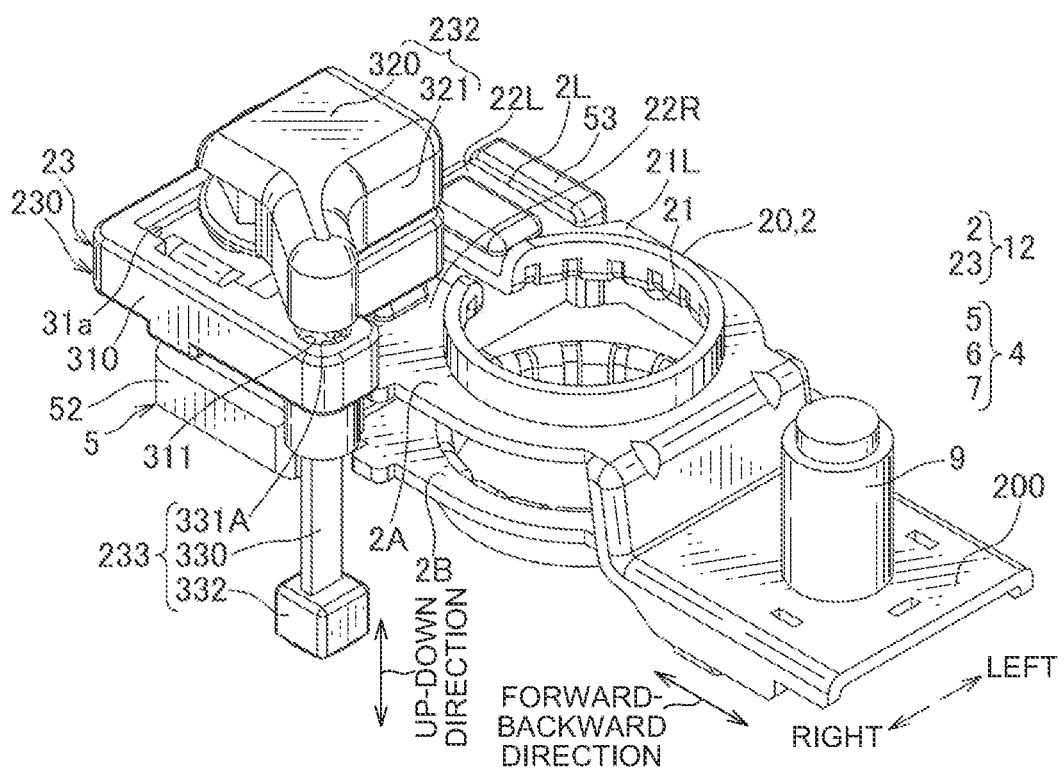
FIG. 11 is a perspective view of a battery terminal according to a second embodiment of the present invention.
Figure 12:
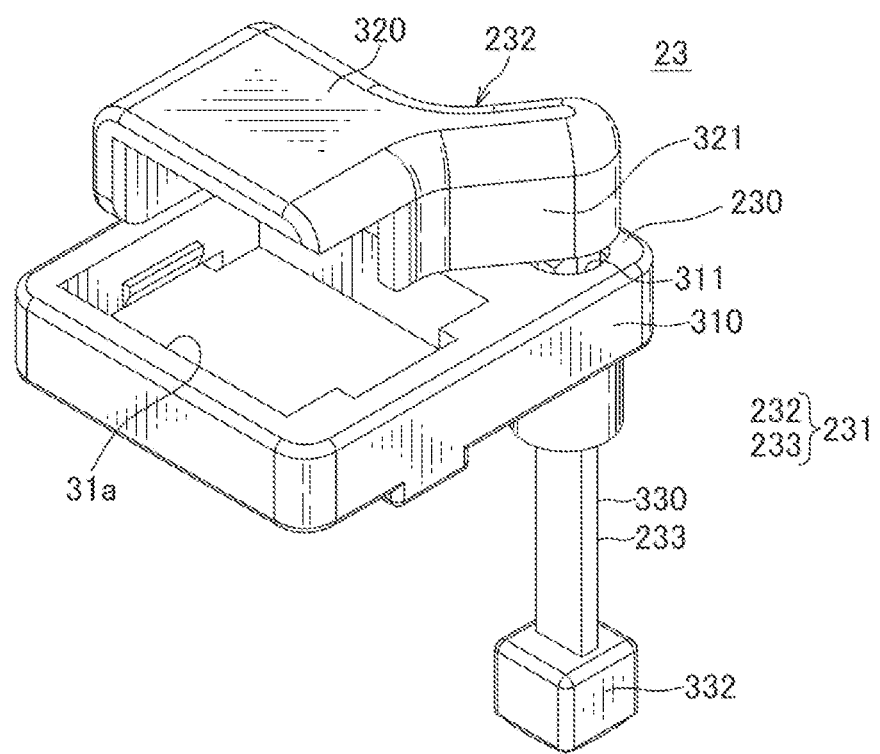
FIG. 12 is a perspective view of a protector as a part of the battery terminal.

Hereinafter, a second embodiment of the present invention will be described with reference to FIGS. 11 to 17. FIG. 11 shows a perspective view of a battery terminal according to a second embodiment of the present invention. FIG. 12 shows a perspective view of a protector as a part of the battery terminal.

As shown in FIG. 11, a battery terminal 12 according to the second embodiment of the present invention includes a terminal main body 2 and a protector 23, the protector 23 being configured to be mounted to the terminal main body 2 and positioned between the terminal main body 2 and the upper surface 101a of the battery main body 101.

Figure 13:
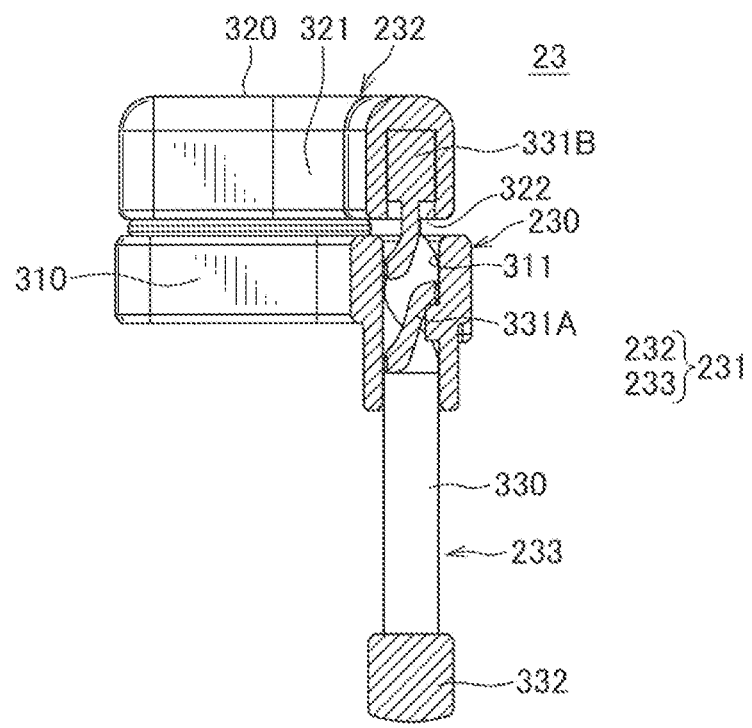
FIG. 13 is a sectional view of the protector.

As shown in FIGS. 12 and 13, the protector 23 includes a protector main body 230 (protector supporting section) and a movable section 231 which is connected to the protector main body 230, wherein the protector main body 230 is configured to be supported by the terminal main body 2.

The protector main body 230 includes a block main body 310 and a nut section 311 as shown in FIGS. 12 and 13, the nut section 311 being provided at a corner of the block main body 310. In the block main body 310, a hole portion 31a is provided which exposes a bolt head 71 of the bolt 7.

In the nut section 311, a threaded portion (its reference sign is omitted) is formed which is screwed to a spiral portion 331A of a rod 233 (bar-shaped section; this will be described later) of the movable section 231 as shown in FIG. 13, wherein the spiral portion 331A is rotatably supported by engaging the threaded portion with the spiral portion 331A. The nut section 311 and the spiral portion 331A of the rod 233 form a ball-nut mechanism.

The movable section 231 includes a cover body 232 (displacement section) and a rod 233 fixed to the cover body 232 as shown in FIGS. 12 and 13, the cover body 232 being configured to cover the hole portion 31a in the block main body 310, wherein the rod 233 is rotatably supported by the nut section 311 of the block main body 310.

As shown in FIG. 13, the cover body 232 includes a plate-shaped section 320, a lateral plate 321, and an insertion and fixing section 322 arranged at a corner of the plate-shaped section 320, the plate-shaped section 320 having a size which enables the hole portion 31a in the block main body 310 to be covered by the plate-shaped section 320, wherein the lateral plate 321 is continuous with a circumference of the plate-shaped section 320 and extends downward, and the insertion and fixing section 322 is configured for inserting and fixing a fixed portion 311B of the rod 233 therein.

The rod 233 includes a rod main body 330 with a bar shape, the spiral portion 331A, the fixed portion 331B, and a contact section 332 as shown in FIG. 13, wherein the spiral portion 331A is arranged above and continuous with the rod main body 330 and rotatably supported by the nut section 311, wherein the fixed portion 331B is arranged above and continuous with the spiral portion 331A and fixed to the cover body 232, wherein the contact section 332 is arranged below and continuous with the rod main body 330 and configured to come into contact with the upper surface 101a of the battery main body 101. This means that the contact section 332 is provided on one end of the rod 233 and the cover body 232 (displacement section) is provided on the other end of the rod 233.

For mounting such a protector 23 to the terminal main body 2, the block main body 310 is sandwiched between the bolt head 71 and an opposed plate section 61 of a bracket 6 in advance before assembling an operating mechanism 4, i.e. before bringing the bolt 7 close to bracket 6 and nut element 5 and rotating the bolt 7. In this state, the hole portion 31a in the block main body 310 is brought close to the bolt head 71 of the bolt 7, the block main body 310 is arranged in a predetermined position, and the bolt 7 is rotated in a tightening direction. In this manner, the protector main body 230 is mounted to the terminal main body 2.

Figure 14:
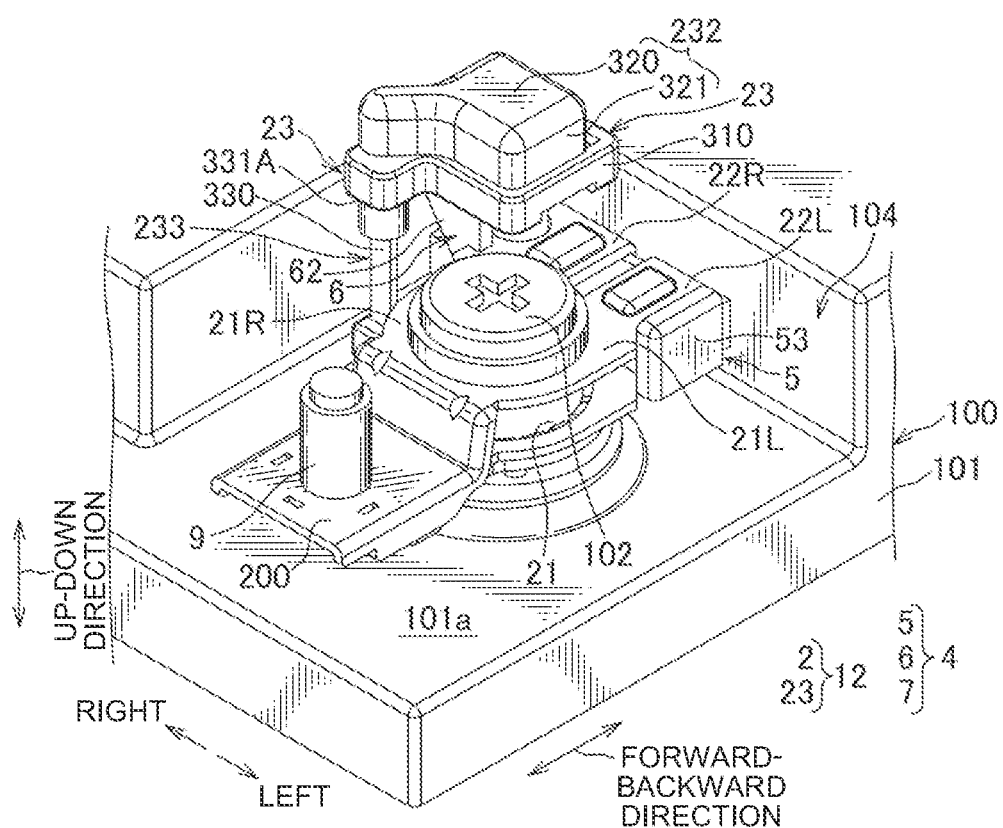
FIG. 14 is a procedure of connecting the battery terminal to the battery post in a perspective view, wherein the protector is in a covering position.
Figure 15A:
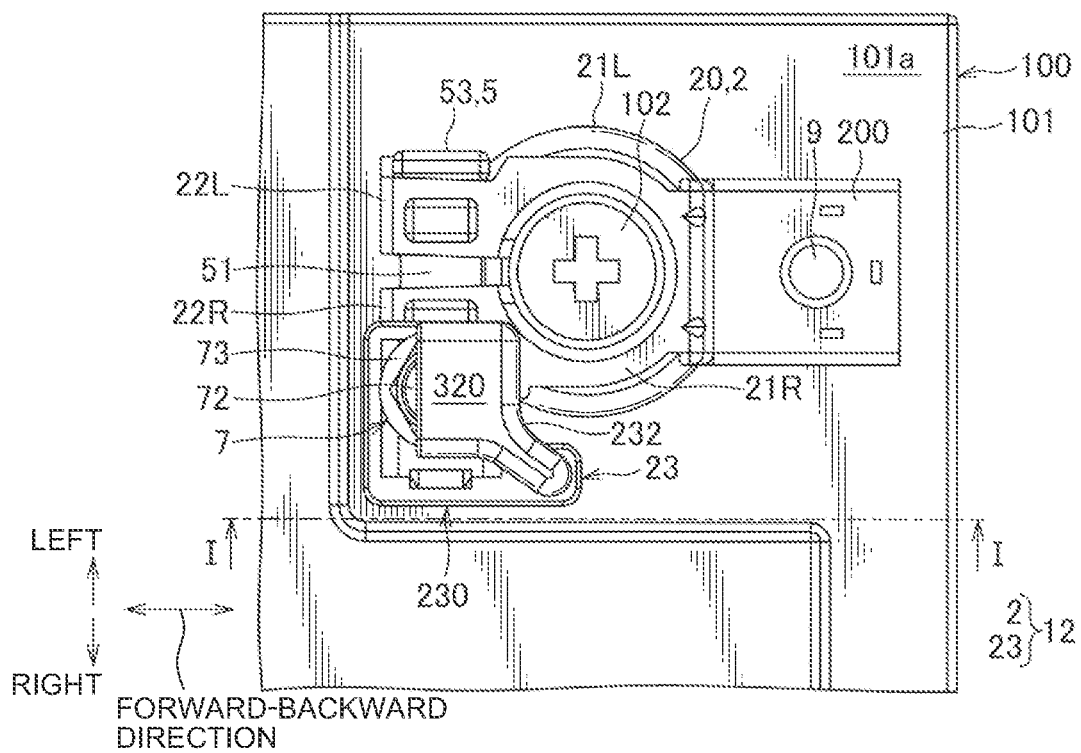
FIG. 15A is a top view of the battery terminal according to FIG. 14.
Figure 15B:
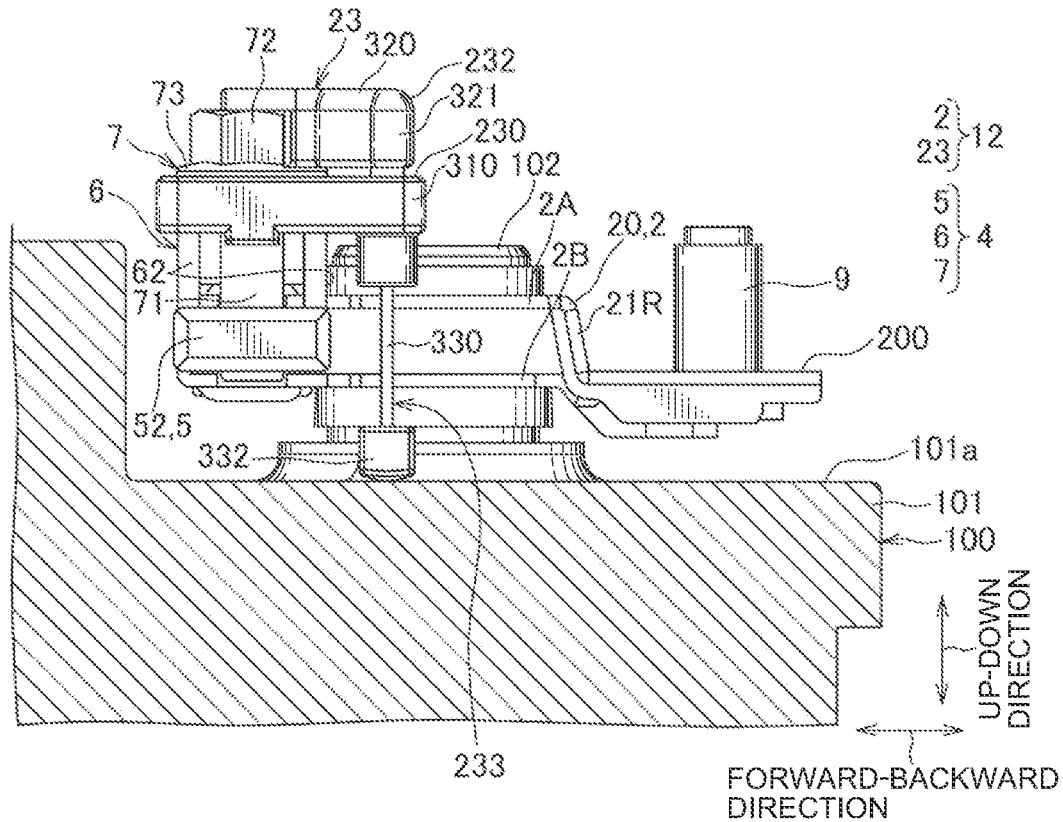
FIG. 15B is a sectional view along the line I-I in FIG. 15A.
Figure 16A:
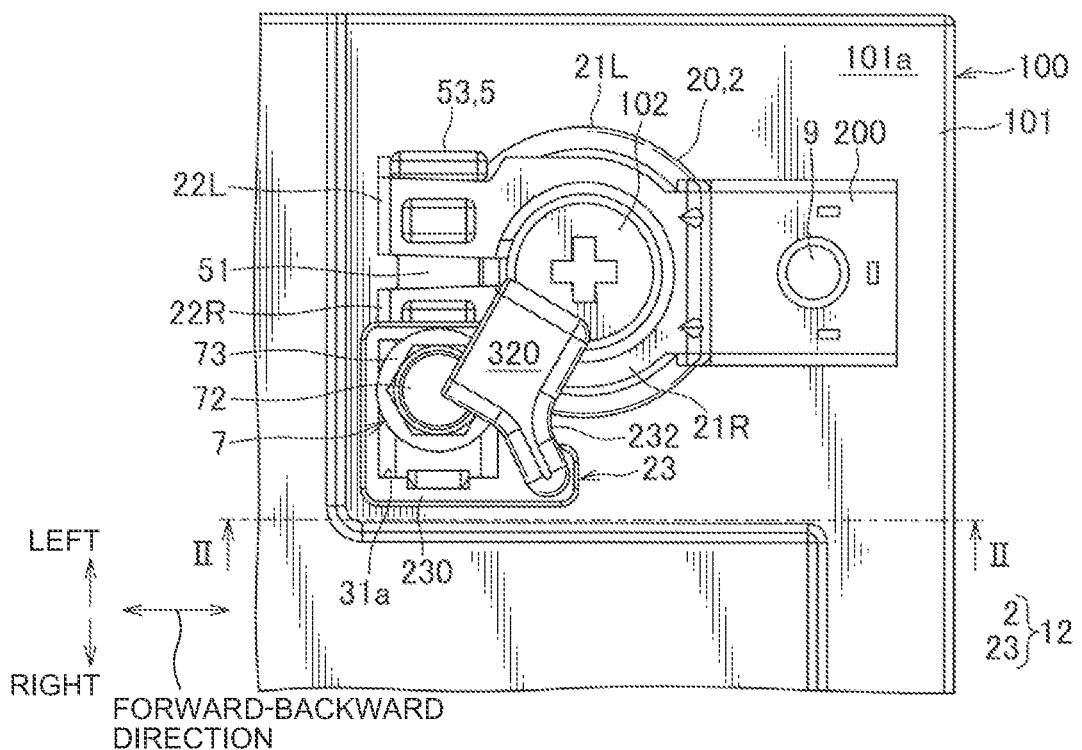
FIG. 16A is a top view of a post-process after FIG. 15A and FIG. 15B.
Figure 16B:
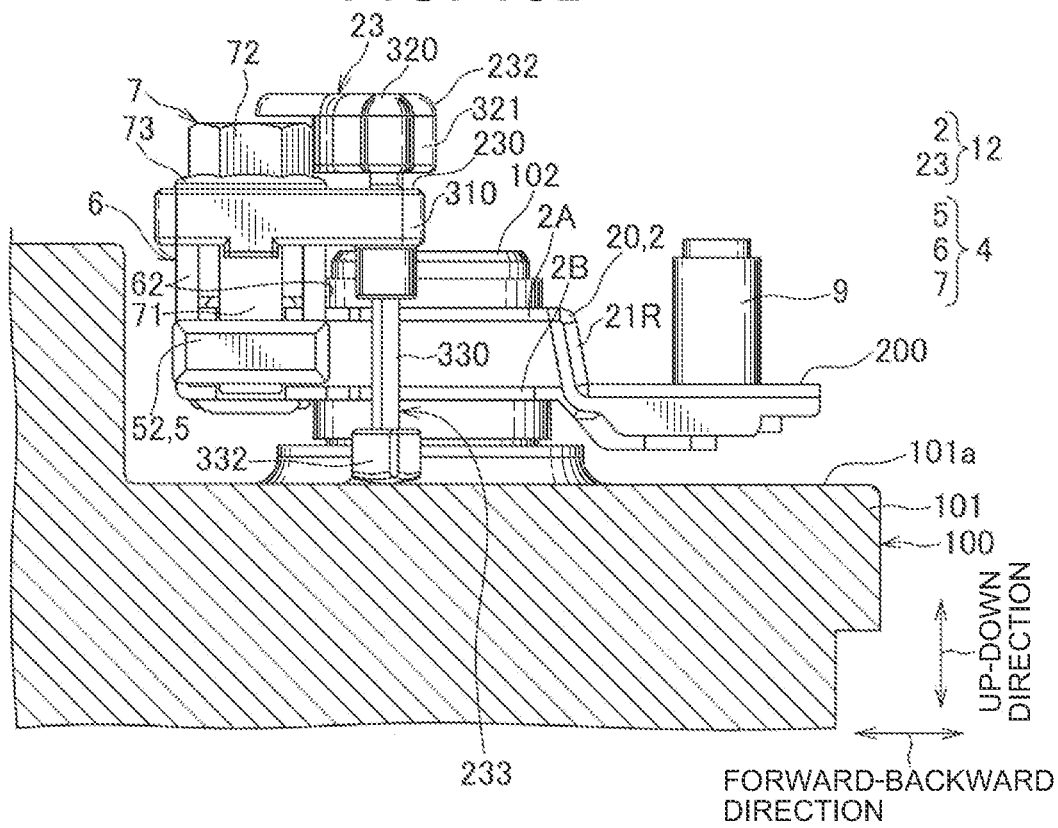
FIG. 16B is a sectional view along the line II-II in FIG. 16A.
Figure 17A:
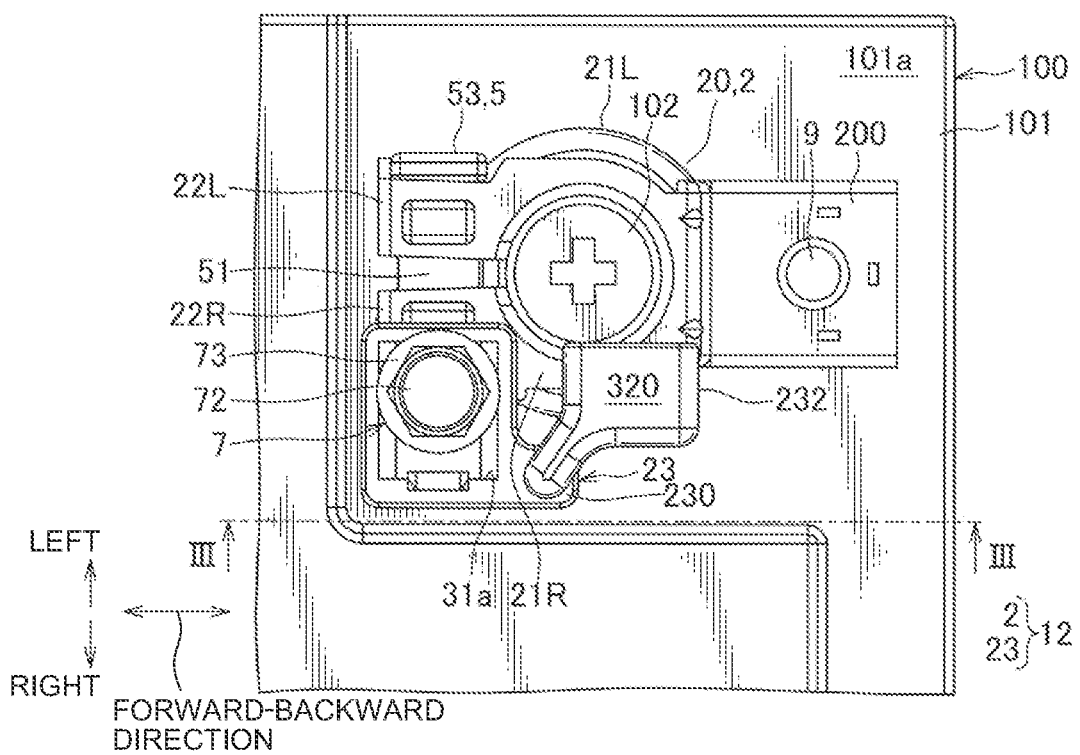
FIG. 17A is a top view of a post-process after FIG. 16A and FIG. 16B with the protector being in the covering position.
Figure 17B:
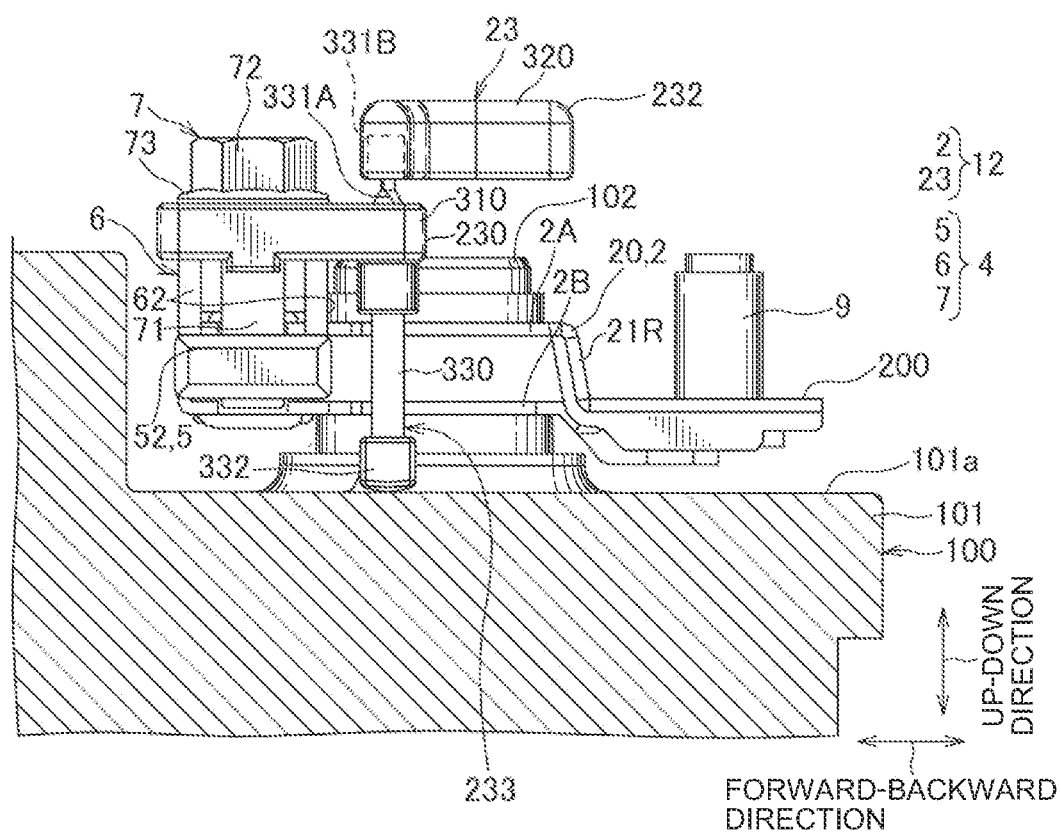
FIG. 17B is a sectional view along the line in FIG. 17A.

In the mounted state of the protector 23 to the terminal main body 2, the cover body 232 is in a first position (covering position) as shown in FIGS. 14, 15 (A) and (B). By pressing the contact section 332 against the upper surface 101a of the battery main body 101 while the contact section 332 is in contact with the upper surface 101a, the rod 233 is rotated relative to the nut section 311 around an axis of the rod main body 330. The contact section 332 is further pressed, and the cover body 232 is rotated together with the spiral portion 331A to partially expose the bolt shaft 71 of the bolt 7 as shown in FIGS. 16 (A) and (B). By further pressing the contact section 332 and thus rotating the spiral portion 331A, the contact section 332 is displaced to a second position, as shown in FIGS. 17(A) and (B).

In this manner, in the case of the incorrect positional relation in which the terminal main body 2 and the upper surface 101a of the battery main body 101 are separated at an inappropriate distance, the bolt 7 may not be operated with this incorrect positional position being kept, so that it is possible to mount the battery terminal 12 to a battery post 102 appropriately. Further, while the protector 3 according to the first embodiment remains elastically deformed in the second position (retracted position) and thus has the risk of degradation, no external force is applied to the protector 23 according to the present embodiment in both of the first and second positions (the protector 23 remains in a natural state), which allows the protector 23 to be used for a longer time as compared to the protector 3 according to the first embodiment.

Further, the protector 23 according to the above-described embodiment is configured so that the rod 33 (bar-shaped section) is rotated relative to the nut section 311 around the axis of the rod main body 330. However, the present invention is not limited thereto. For example, the protector main body 230 may have a guide groove which extends in the forward-backward direction, wherein the cover body 232 (displacement section) may be displaceable between the first position (covering position) and the second position (retracted position) by rotating the bar-shaped along the guide groove while the contact section 332 is in contact with the upper surface 101a of the battery main body 101, wherein the cover body 232 covers the operating section 7 in the first position, and in the second position, the cover body 232 is retracted to an outside of the operating section 7 from the first position. In this case, the ball-nut mechanism may be omitted, and the cover body 232 may be fixed to an upper end of the bar-shaped section.

Further, according to the above-described embodiment, the bolt 7 is used as the operating section, wherein the battery post 102 is tightened with the pair of clamping sections 21R and 21L by rotating the bolt 7. However, the present invention is not limited thereto. A lever which is not shown may be used as the operating section, wherein the battery post 102 may be tightened with the pair of clamping sections 21R and 21L by rotating the lever.

Therefore, the description with limited shapes, material characteristics etc. according to the above disclosure is not limiting the present invention, but merely illustrative for easier understanding the present invention so that the description using names of the elements without a part or all of the limitations to their shapes, material characteristics etc. is also included in the present invention. Namely, while the present invention is particularly shown and described mainly with regard to the specific embodiments, the above mentioned embodiments may be modified in various manners in shape, material characteristics, amount or other detailed features by those skilled in the art without departing from the scope of the technical idea and purpose of the present invention. Therefore, the description with limited shapes, material characteristics etc. according to the above disclosure is not limiting the present invention, but merely illustrative for easier understanding the present invention so that the description using names of the elements without a part or all of the limitations to their shapes, material characteristics etc. is also included in the present invention.

REFERENCE SIGNS LIST 1, 11, 12 Battery terminal
2 Terminal main body
3, 13, 23 Protector
7 Bolt (operating section)
21R, 21L Pair of clamping sections
22R, 22L Pair of approach/separation elements (a pair of opposed sections)
30, 130, 230 Protector main body (protector supporting section)

31, 131, 231 Movable section
32 First continuous section
33 Second continuous section
36 Fifth continuous section (displacement section)
3A Boundary position between the protector supporting section and the first continuous section
3B, 332 Contact section
232 Cover body (displacement section)
233 Rod (bar-shaped section)
101 Battery main body
101a Upper surface of the battery main body
102 Battery post

What is claimed is:

1. A battery terminal configured to be connected to a battery post which protrudes from an upper surface of a battery main body, comprising:
    a terminal main body; and
    a protector configured to be mounted to the terminal main body and positioned between the terminal main body and the upper surface of the battery main body;
    wherein the terminal main body includes a pair of clamping sections and an operating section, the pair of clamping sections being configured to clamp the battery post and the operating section being configured to cause the pair of clamping sections to approach each other and tighten the battery post,
    wherein the protector includes a protector supporting section supported by the terminal main body, and a movable section connected to the protector supporting section,
    wherein the protector is formed from a single plate-shaped element, and the movable section is formed by bending the plate-shaped element,
    wherein the movable section is cantilevered from the terminal body and is provided with a contact section and a displacement section, the contact section being configured to be brought into contact with the upper surface of the battery main body, and the displacement section being configured to be displaced with an external force applied on the contact section,
    wherein the displacement section is provided so as to be freely displaced between a covering position and a retracted position, wherein the displacement section is configured to cover the operating section in the covering position, and in the retracted position, to be retracted to an outside of the operating section from the covering position,
    wherein when the displacement section is in the covering position, an access to the operating section is limited,
    wherein the displacement section is configured to be displaced from the covering position to the retracted position by pressing the contact section against the upper surface of the battery main body so that the access to the operating section is allowed,
    wherein the movable section includes a second continuous section which is continuous from the contact section to the displacement section, and
    wherein when the displacement section is in the covering position, the second continuous section is configured to be in contact with the upper surface of the battery main body.

2. The battery terminal according to claim 1, wherein the movable section includes a first continuous section which is continuous with the protector supporting section and the contact section.

3. The battery terminal according to claim 1, wherein the operating section comprises a bolt.

4. A battery terminal configured to be connected to a battery post which protrudes from an upper surface of a battery main body, comprising:
    a terminal main body; and
    a protector configured to be mounted to the terminal main body;
    wherein the terminal main body includes a pair of clamping sections and an operating section, the pair of clamping sections being configured to clamp the battery post and the operating section being configured to cause the pair of clamping sections to approach each other and tighten the battery post,
    wherein the protector includes a protector supporting section supported by the terminal main body, and a movable section connected to the protector supporting section,
    wherein the movable section is provided with a contact section and a displacement section, the contact section being configured to be brought into contact with the upper surface of the battery main body, and the displacement section being configured to be displaced with an external force applied on the contact section,
    wherein the displacement section is provided so as to be freely displaced between a covering position and a retracted position, wherein the displacement section is configured to cover the operating section in the covering position, and in the retracted position, to be retracted to an outside of the operating section from the covering position,
    wherein when the displacement section is in the covering position, an access to the operating section is limited,
    wherein the displacement section is configured to be displaced from the covering position to the retracted position by pressing the contact section against the upper surface of the battery main body so that the access to the operating section is allowed,
    wherein the movable section includes a second continuous section which is continuous from the contact section to the displacement section, and
    wherein when the displacement section is in the covering position, the second continuous section is configured to be in contact with the upper surface of the battery main body.

* * * * *